Feb. 20, 1962   J. V. PAGLEY   3,021,678
MASTER CYLINDER FOR FLUID BRAKE SYSTEMS
Filed Dec. 8, 1959   2 Sheets-Sheet 1

INVENTOR
JAMES V. PAGLEY
BY Francis J. Klempay
ATTORNEY

Feb. 20, 1962    J. V. PAGLEY    3,021,678
MASTER CYLINDER FOR FLUID BRAKE SYSTEMS
Filed Dec. 8, 1959    2 Sheets-Sheet 2

INVENTOR
JAMES V. PAGLEY
BY Francis J. Klempay
ATTORNEY

United States Patent Office 3,021,678
Patented Feb. 20, 1962

3,021,678
MASTER CYLINDER FOR FLUID
BRAKE SYSTEMS
James V. Pagley, Box 14, Edinburg, Pa.
Filed Dec. 8, 1959, Ser. No. 858,185
2 Claims. (Cl. 60—54.6)

The present invention relates generally to fluid brake systems for vehicles and the like and more particularly to the provision of an improved master cylinder for use in such brake systems.

As will be understood by those skilled in the art, it is common practice to provide a vehicle, such as an automobile, for example, with a fluid brake system wherein each of the wheels is provided with a brake that is operated by a fluid brake cylinder. The fluid brake cylinders are connected by means of suitable conduits or brake lines to a master cylinder whose piston is moved in response to the actuation of a brake pedal or similar member. The arrangement is such that when the brake pedal is depressed the piston of the master cylinder is moved to force fluid through the various brake lines to the fluid brake cylinders whereby each of the brakes is operated.

While the above described fluid brake system is widely employed, one very serious disadvantage thereof is that if any of the brake lines break or become ruptured or if any of the fluid brake cylinders leak, the fluid in the system is lost and the brakes of the vehicle are rendered totally inoperative. This presents a serious safety problem which has long been recognized in the art but to which, to the present time, a satisfactory solution has not been found. It has been previously suggested to insert various flow responsive shut-off valves in the brake lines leading to the fluid braking cylinders but this has been found to be unacceptable because of the high cost involved and because such valves are not adapted for the intended use. It also has been proposed to employ a multiple piston master cylinder but, heretofore, such an arrangement has been found impractical because adjustments are necessary to compensate for the uneven wear of the brake shoes and other inaccuracies occurring during the normal operation of the brake system and it has been impossible to insure equalization of the fluid pressure supplied to the respective fluid brake cylinders.

It is the primary or ultimate object of this invention to provide a highly improved master cylinder for fluid brake systems which employs a plurality of pistons and wherein the safety of operation of a vehicle is greatly increased since the hazards of accidents likely to occur when the brake lines rupture or when the fluid brake cylinders become leaky are eliminated. As will become hereinafter more fully apparent, the arrangement is such that even if one or more of the brake lines become ruptured, sufficient fluid is retained in the system whereby the other fluid brake cylinders may be operated in a normal manner.

Yet another object of the invention is to provide a multiple piston master cylinder for fluid brake systems wherein the fluid pressure supplied to the brake cylinders is always equalized. The brake system is self regulating in an automatic and highly efficient manner to compensate for uneven wear and other irregularities in the individual brake operating mechanisms without the use of various and complicated adjustment means which have characterized prior art apparatus.

Still another object of this invention is to provide a master cylinder for fluid brake systems of the type above described which is adapted to be easily installed in motor vehicles or the like and which is of highly simplified and low cost construction.

The above, as well as other objects and advantages of the invention, will become more fully apparent upon consideration of the following specification and accompanying drawing wherein there is disclosed a preferred embodiment of the invention.

Figure 1:
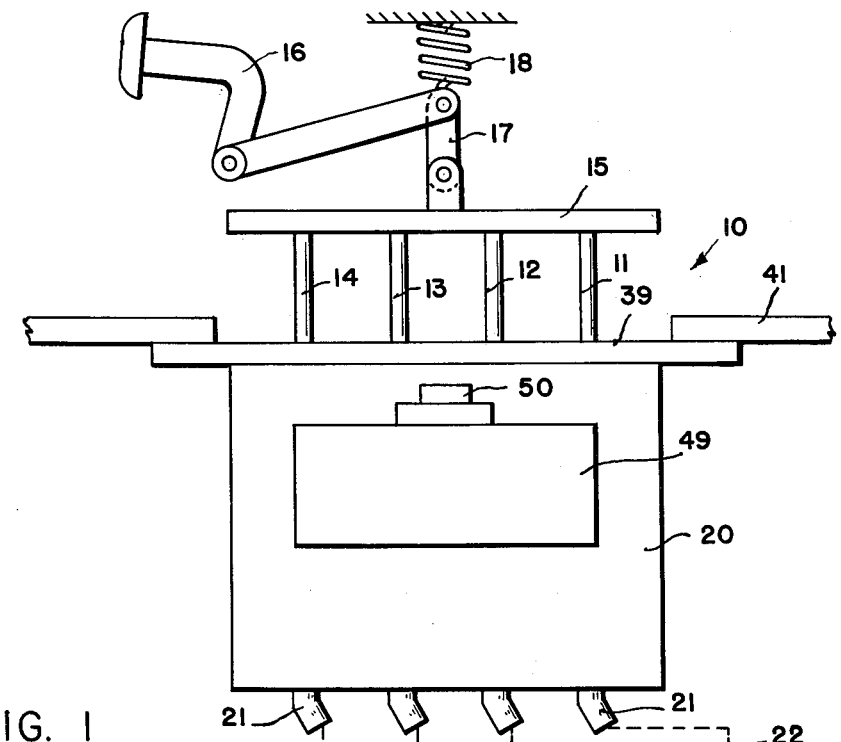
FIGURE 1 is a schematic elevational view showing a master cylinder constructed in accordance with the teachings of the present invention connected in a fluid brake system for an automobile.
Figure 2:
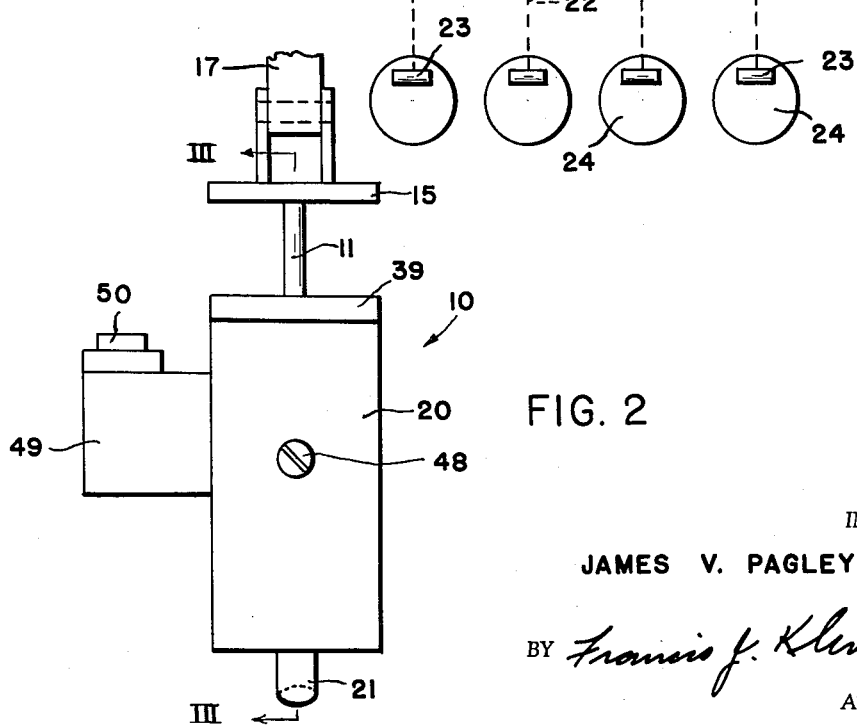
FIGURE 2 is a fragmentary end view of the apparatus shown in FIGURE 1.

Referring now to the drawing and initially to FIGURES 1 and 2 thereof, the reference numeral 10 designates generally the multiple piston fluid cylinder of the present invention having a plurality of vertically extending plunger rods 11—14 which are connected at their upper ends to a crosshead 15. The crosshead 15 is connected to a brake pedal 16 by means of suitable linkage 17 and a spring 18, or other suitable biasing means, is attached to the vehicle frame and is operative to bias the crosshead 15 and the plunger rods 11—14 upwardly to the positions shown in the various views of the drawing.

The master cylinder 10 comprises a cylinder housing 20 which has a plurality of longitudinally spaced fluid fittings 21 projecting downwardly from the bottom surface thereof. Each of the fluid fittings 21 is connected by a suitable conduit or brake line, designated by the broken lines 22 in FIGURE 1 of the drawing, to a fluid brake cylinder 23 which is associated with a vehicle wheel 24. As will be hereinafter more fully apparent, the arrangement is such that during normal operation of the fluid brake system, fluid is forced through the conduits or brake lines 22 to the fluid brake cylinders 23 when the vehicle operator depresses the brake pedal 16 to lower the crosshead 15 and the plunger rods 11—14.

The cylinder housing 20 is a generally rectangular block-like member which is provided with four vertically extending bores 25 that define cylinders and each of these cylinders is connected at its lower end to one of the brake lines 22 by means of the fluid fitting 21. Received in each of the cylinders 25 is a piston 26 which comprises a metal spool 27, a pair of cup-shaped resilient sealing members 28 and 29 and a plunger rod plate 30 having a dished or concave upper surface. The piston 26 is assembled with the cup-shaped sealing member 28 disposed below the lower end of the spool 27 while the cup-shaped sealing member 29 is clamped between the upper end of the spool 27 and the plunger rod plate 30. The plunger rod plate is attached to the spool 27 by means of a pin 32 which extends through the cup-shaped sealing member 29. The pistons 26 are relatively simple in construction but yet are characterized by their ability to provide excellent fluid seals between those portions of the cylinders 25 disposed on opposite sides thereof.

Figure 3:
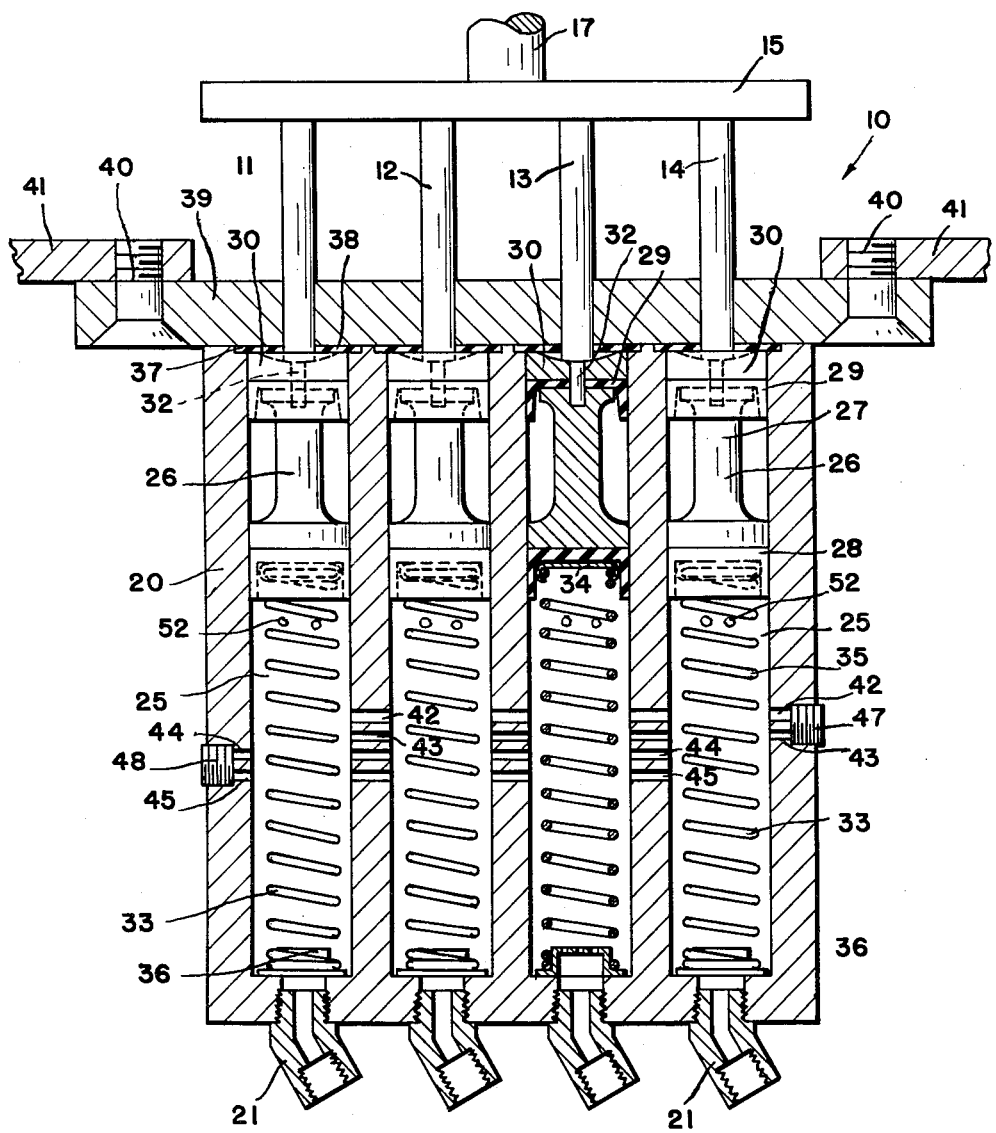
FIGURE 3 is an enlarged sectional view taken along the section line III—III of FIGURE 2.

Also received in each of the bores 25 below the piston 26 associated therewith is a spring assembly 33 which comprises an upper spring plate 34, a coil spring 35 and a cup-shaped strainer 36. The upper spring plate 34 is received over the upper end of the spring 35 and nests within the center opening of the cup-shaped sealing member 28 while the strainer 36 is disposed adjacent the lower end of the cylinder 25. The springs 35 serve to bias the pistons 26 in their upper positions as shown in FIGURE 3 while the strainers 36 prevent the passage of particles, sediment, etc. into the brake lines 22. It will be noted that the lower ends of the plunger rods 11—14 bear against and engage the plunger rod plates 30. The arrangement is such that when the brake pedal 16 is depressed to lower the crosshead 15 the pistons 26 will be lowered in the cylinders 25 against the forces exerted by the springs 35.

Each of the cylinders 25 has an annular recess 37 formed in the upper edge thereof that provides a supporting shoulder for an annular and resilient washer 38 which encircles the plunger rod associated therewith. Rigidly attached to the upper surface of the cylinder block 20 is a cover plate 39 whose ends project laterally and are adapted to be securely fastened, by means of bolts 40, for example, to frame portions 41 of the vehicle. The washers 38 seal the cylinders 25 from above and serve as wipers which keep the plunger rods 11—14 clean. The multiple piston master cylinder is adapted to be mounted in a vertical relation for reasons to be later explained.

Intermediate the vertical lengths of the cylinders 25 there are provided a plurality of vertically spaced and transversely extending passageways 42, 43, 44 and 45 which extend through the side walls of the cylinders 25 and interconnect these cylinders. The arrangement is such that the areas of the cylinders 25 below the passageways 42—45 are interconnected and provide, in essence, a large reservoir or fluid sump. In the illustrated embodiment of the invention, the passageways 42 and 43 are provided by drilling two holes from one outer end wall of the master cylinder housing 20 through the three intermediate divider walls while the passageways 44 and 45 are provided by drilling two holes through the opposite outer end wall and through the three intermediate vertically extending divider walls. The passageways 42 and 43 in the first mentioned outer end wall are blocked by a capping nut 47 while the passageways 44 and 45 in the other end wall are blocked in a similar manner by a capping nut 48. The passageways 42—45 are of relatively small diameters to prevent undue wear on or hanging up of the various cup-shaped sealing members of the pistons 26. A sufficient number of the passageways 42—45 are provided to handle the required volume of fluid flow between the various cylinders 25 of the master cylinder. If the plurality of passageways 42—45 were replaced by a single large diametered transversely extending passageway the pistons 26 would tend to hang up and the sealing members would become unduly worn during the normal use of the master cylinder.

Attached to one side surface of the cylinder block 20 is a reservoir 49 having a removable filler cap 50 on the upper surface thereof. The reservoir 49 is adapted to hold a quantity of the brake fluid and is in communication with the cylinders 25 by means of ports 52 (see FIGURE 3) which open into the cylinders 52 above the interconnecting passageways 42—45 but below the retracted positions of the pistons 26.

Considering now the operation of the apparatus above described, the brake lines 22 and those portions of the cylinders 25 below the pistons 26 will normally be filled with brake fluid and will be maintained in a filled condition by the reservoir 49. When the brake pedal 16 is depressed the crosshead 15 will be forced downwardly to lower the plunger rods 11—14 and the multiple pistons 26 against the forces exerted by the compression springs 35. This, of course, causes fluid under pressure to flow through the brake lines 22 to operate the fluid brake cylinders 23. Since the cylinders 25 are interconnected by means of passageways 42—45 the fluid will flow between the various cylinders 25 in such a manner that the fluid pressure supplied to each of the fluid brake cylinders 23 is at all times equalized. The master cylinder automatically compensates for any inaccuracies in the individual brake operating means due to brake lining wear, for example, and the external adjustments which have characterized prior art apparatus are completely eliminated.

If one of the brake lines 22 becomes ruptured, the brake fluid will drain from the fluid cylinder 25 associated therewith, from the reservoir 49 and from the other fluid cylinders 25 to the level of the lowest interconnecting passageways 45. However, it will be noted that fluid remains in the other of the cylinders 25 to the level of a passageway 45. Therefore, upon the next actuation of the brake pedal 16, the operator will be informed that something is wrong in the fluid brake system since he must depress the brake pedal 16 further to operate the remaining portions of the brake system. There is still sufficient fluid in the fluid cylinders 25 which have not been completely drained to insure proper operation of the brakes associated with the undamaged lines. This greatly increases the safety of the fluid brake system since it is impossible for the operator to completely lose his brakes when one portion of the fluid system becomes leaky or ruptured and the vehicle may be operated safely until the fault in the fluid brake system can be repaired.

The disclosed embodiment of this invention is shown to comprise four cylinders in the master cylinder housing but it should be understood that more or less of such cylinders can be provided as is required for any particular fluid brake system. It should be noted that the master cylinder is of extremely simple construction and is characterized by its low cost and maintenance free operation which is ideally suited for the purposes intended.

Although I have shown and described an illustrated embodiment of the present invention, it should be understood that many changes may be made therein without departing from the true scope or intent thereof. Accordingly, reference should be had to the following appended claims.

I claim:

1. A master cylinder assembly for a motor vehicle of the kind having a plurality of hydraulic wheel brake cylinders comprising a block-like housing having a plurality of adjacent vertically disposed cylindrical bores therein, each of said bores having a port in its bottom end for individual conduit connection with said brake cylinders, said bores having common side walls, apertures in said side walls spaced upwardly from said ports to provide intercommunication between said bores, a hydraulic fluid reservoir associated with said housing, other apertures in the side walls of said bores upwardly of the first mentioned apertures communicating with said reservoir, pistons in said bores having normal retracted positions above said other apertures and normal operating strokes extending downwardly past said other apertures to positions above the first mentioned apertures, means interconnecting said pistons for operating the same in unison, and means biasing said pistons to upper retracted positions, the arrangement being such that during normal braking actuations the pressures in said connecting conduits are equalized and upon a leak developing in any of said conduits or brake cylinders said pistons may descend vertically below the first mentined apertures to apply fluid pressure to the sound conduits and brake cylinders.

2. A master cylinder assembly for a motor vehicle of the kind having a plurality of hydraulic wheel brake cylinders comprising a block-like housing having a flat upper end surface and a plurality of adjacent vertically disposed cylindrical bores extending downwardly from said surface, each of said bores having a port in its bottom end for individual conduit connection with said brake cylinders, said bores having common side walls, apertures in said side walls spaced upwardly from said ports to provide intercommunication between said bores, a hydraulic fluid reservoir associated with said housing, other apertures in the side walls of said bores upwardly of the first mentioned apertures communicating with said reservoir, pistons in said bores having normal retracted positions above said other apertures and normal operating strokes extending downwardly past said other apertures to positions above the first mentioned apertures, said upper surface of said housing having annular recesses concentric about said bores, an annular resilient sealing washer received in each of said recesses, a cover plate for said housing having bores therethrough aligned with the first mentioned bores, a vertically movable crosshead, operating rods slideable in said bores in said plate and in said washers interconnecting said crosshead and said pistons, and means biasing said pistons to upper retracted positions, the arrangement being such that during normal braking actuations the pressures in said connecting conduits are equalized and upon a leak developing in any of said conduits or brake cylinders said pistons may descend vertically below the first mentioned apertures to apply fluid pressure to the sound conduits and brake cylinders.

References Cited in the file of this patent

UNITED STATES PATENTS

| | | |
|---|---|---|
| 1,707,781 | Blanchard | Apr. 2, 1929 |
| 2,142,174 | Burrow | Jan. 3, 1939 |
| 2,146,193 | Rippe | Feb. 7, 1939 |
| 2,152,345 | Bowen | Mar. 28, 1939 |
| 2,561,009 | Byers et al. | July 17, 1951 |
| 2,679,729 | Swift | June 1, 1954 |
| 2,747,372 | York | May 29, 1956 |

FOREIGN PATENTS

| | | |
|---|---|---|
| 446,941 | Canada | Mar. 2, 1948 |